United States Patent
Galizzi et al.

(10) Patent No.: US 12,497,008 B2
(45) Date of Patent: Dec. 16, 2025

(54) METHOD FOR CONTROLLING THE DECELERATION OF A VEHICLE AND A BRAKING SYSTEM

(71) Applicant: BREMBO S.p.A., Curno (IT)

(72) Inventors: Valerio Galizzi, Curno (IT); Martina Truffello, Curno (IT); Francesco Dozzi, Curno (IT); Luca Ugolini, Curno (IT); Fabrizio Forni, Curno (IT); Davide Paolini, Curno (IT)

(73) Assignee: Brembo S.p.A., Bergamo (IT)

( * ) Notice: Subject to any disclaimer, the term of this patent is extended or adjusted under 35 U.S.C. 154(b) by 81 days.

(21) Appl. No.: 18/266,291

(22) PCT Filed: Dec. 10, 2021

(86) PCT No.: PCT/IB2021/061545
§ 371 (c)(1),
(2) Date: Jun. 9, 2023

(87) PCT Pub. No.: WO2022/123503
PCT Pub. Date: Jun. 16, 2022

(65) Prior Publication Data
US 2024/0042978 A1    Feb. 8, 2024

(30) Foreign Application Priority Data
Dec. 10, 2020    (IT) .................. 102020000030368

(51) Int. Cl.
*B60T 8/32*    (2006.01)
*B60T 7/08*    (2006.01)
(Continued)

(52) U.S. Cl.
CPC ............ *B60T 8/3255* (2013.01); *B60T 7/085* (2013.01); *B60T 8/171* (2013.01); *B60T 8/172* (2013.01);
(Continued)

(58) Field of Classification Search
CPC ........ B60T 8/3255; B60T 7/085; B60T 8/171; B60T 8/172; B60T 13/74; B60T 17/22;
(Continued)

(56) References Cited

U.S. PATENT DOCUMENTS 5,804,941 A * 9/1998 Ray ...................... G05B 19/232
                                                                      318/400.11
8,996,268 B2 * 3/2015 Garbe ........................ B60L 7/10
                                                                      701/1

(Continued)

FOREIGN PATENT DOCUMENTS

DE    102018202737 A1    8/2019
EP    1108632 B1    6/2001
(Continued)

OTHER PUBLICATIONS

European Patent Office, International Search Report, issued in PCT/IB2021/061545, Mar. 3, 2022, Rijswijk, NL.

*Primary Examiner* — Joseph J Dallo
(74) *Attorney, Agent, or Firm* — Marshall & Melhorn, LLC

(57) ABSTRACT

A method for controlling deceleration of a vehicle is provided. The vehicle has a braking system having a braking actuation lever, a braking actuator, and at least one braking device. The method involves measuring a current lever position of the braking actuation lever and a current lever speed of the braking actuation lever, dynamically mapping the current lever position and the current lever speed, processing a deceleration curve as a function of the dynamic mapping, and decelerating the vehicle according to the deceleration curve for each current lever position measured in a lever stroke.

20 Claims, 8 Drawing Sheets

(51) Int. Cl.
  *B60T 8/171* (2006.01)
  *B60T 8/172* (2006.01)
  *B60T 13/74* (2006.01)
  *B60T 17/22* (2006.01)
(52) U.S. Cl.
  CPC .............. *B60T 13/74* (2013.01); *B60T 17/22* (2013.01); *B60T 2210/32* (2013.01); *B60T 2220/04* (2013.01); *B60T 2230/00* (2013.01); *B60T 2240/00* (2013.01); *B60T 2250/00* (2013.01); *B60T 2250/04* (2013.01); *B60T 2270/10* (2013.01); *B60T 2270/304* (2013.01)
(58) Field of Classification Search
  CPC ............. B60T 2210/32; B60T 2220/04; B60T 2230/00; B60T 2240/00; B60T 2250/00; B60T 2250/04; B60T 2270/10; B60T 2270/304; B60T 2270/86; B60T 7/042; B60T 13/662; B60Y 2400/81
  See application file for complete search history.

(56) References Cited

U.S. PATENT DOCUMENTS

| | | | | |
|---|---|---|---|---|
| 9,592,810 | B2 * | 3/2017 | Konishi | B60T 17/228 |
| 9,707,945 | B2 * | 7/2017 | Sakurazawa | B60T 8/4081 |
| 9,751,517 | B2 * | 9/2017 | Choi | B60W 30/18127 |
| 9,834,110 | B2 * | 12/2017 | Nobumoto | B60W 10/184 |
| 10,005,435 | B2 * | 6/2018 | Gotoh | B60T 7/065 |
| 10,076,961 | B2 * | 9/2018 | Seol | B60T 1/10 |
| 10,597,019 | B2 * | 3/2020 | Ito | B60T 8/17557 |
| 10,857,891 | B2 * | 12/2020 | Lee | B60T 13/58 |
| 11,192,540 | B2 * | 12/2021 | Takagi | B60W 10/26 |
| 11,345,346 | B2 * | 5/2022 | Pan | B60W 40/105 |
| 11,458,943 | B2 * | 10/2022 | Leiber | B60T 7/042 |
| 11,912,168 | B2 * | 2/2024 | Kim | B60L 3/108 |
| 12,090,974 | B2 * | 9/2024 | Mannherz | B60T 7/042 |
| 2011/0130935 | A1 | 6/2011 | Krueger et al. | |
| 2012/0139330 | A1 * | 6/2012 | Morishita | B60T 13/586 |
| | | | | 303/3 |
| 2014/0067222 | A1 | 3/2014 | Sim et al. | |
| 2014/0136069 | A1 | 5/2014 | Jung et al. | |

FOREIGN PATENT DOCUMENTS

| | | |
|---|---|---|
| EP | 1324903 B1 | 7/2004 |
| EP | 2460701 A2 | 6/2012 |
| GB | 2580710 A | 7/2020 |

* cited by examiner

METHOD FOR CONTROLLING THE DECELERATION OF A VEHICLE AND A BRAKING SYSTEM

FIELD OF THE INVENTION

The present invention relates to a method for controlling the deceleration of a vehicle and a braking system for implementing said method.

BACKGROUND ART

As known, braking systems allow decelerating a vehicle. Braking systems are activated by a vehicle user, usually by actuating a lever. The response of the braking system to the actuation of the lever varies according to the conditions at the vehicle contour, i.e. on the speed thereof, on the state of the road surface, on the conditions of the engine and the wheels. For example, at high vehicle speeds, the response of the braking system on actuation of the lever is often poorly responsive, whereas, on the contrary, at low speeds, it is often too responsive, causing uncomfortable driving conditions or situations of danger for the vehicle user or for road users.

To overcome such drawback, solutions are known in which the braking system is provided with a control unit, which modulates the activation of the braking system according to the position of the actuation lever correlated to the speed of the vehicle. For example, a system of this type is known from documents EP1108632B1.

To overcome such drawback, other solutions, known, for example, from documents US20140067222A1, US20140136069A1 and EP1324903, teach selecting a braking mode a priori and modulating the activation of the braking system according to the selected braking mode and the position of the actuation lever.

Although such solutions of the known type overcome some drawbacks, the braking response might be too prompt and not very comfortable with slow actuations of the actuation lever, or it could be poorly reactive with impulsive actuations of the actuation lever.

Moreover, such solutions are poorly resilient and poorly adaptable to sudden changes in the driving conditions.

Therefore, the need is strongly felt to customize the deceleration of the vehicle according to a plurality of vehicle driving conditions.

Furthermore, the need is strongly felt to control the deceleration of the vehicle in a more reliable manner than that known.

Therefore, the problem underlying the present invention is to conceive a method for controlling the deceleration of a vehicle and a braking system adapted to implement such method, having such structural and functional features as to satisfy the aforesaid needs and simultaneously overcome the stated drawbacks with reference to the prior art and meet the aforesaid needs.

Solution

The objective of the present invention is to provide a method for controlling the deceleration of a vehicle and a braking system adapted to implement such method.

This and other objects and advantages are achieved with a method and a braking system according as described and claimed herein.

Some advantageous embodiments are also described.

From an analysis of this solution, it emerged how the suggested solution allows improving the control of the deceleration with respect to what is known, ensuring decelerations adapted to a plurality of vehicle movement conditions.

DRAWINGS

Further features and advantages of the method for controlling the deceleration of a vehicle and the braking system will become apparent from the description provided below of preferred embodiments thereof, given by way of non-limiting example, with reference to the accompanying drawings, in which.

Figure 1:
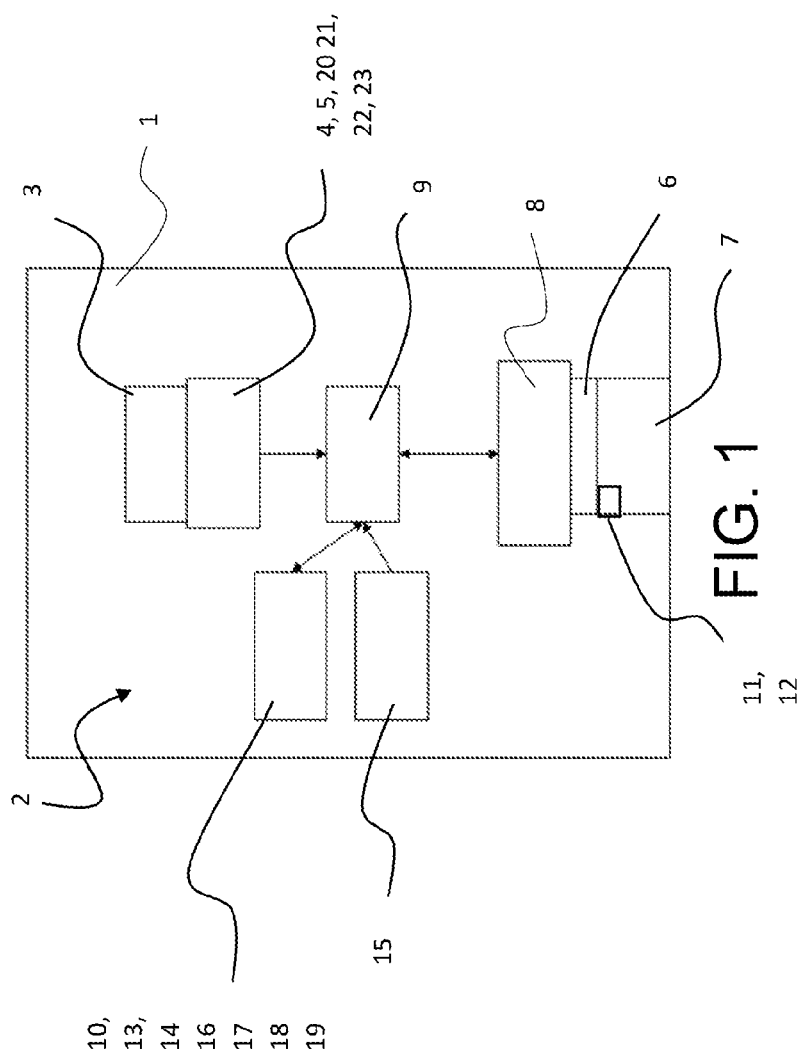
FIG. 1 is a diagram of a braking system of a vehicle according to the present invention.
Figure 2:
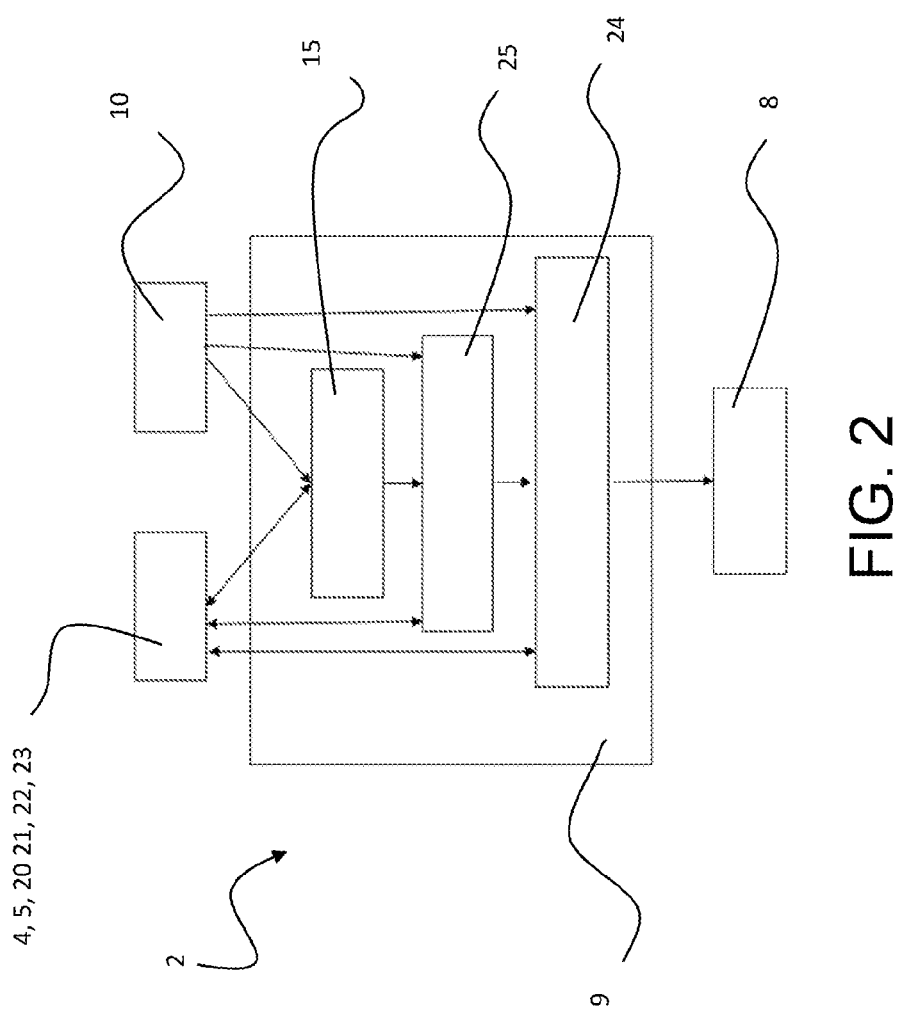
FIG. 2 is an implementation flow diagram of a method for controlling deceleration according to the present invention.
Figure 3:
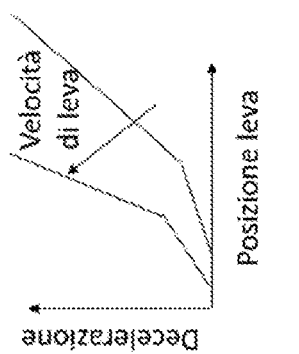
Figure 4:
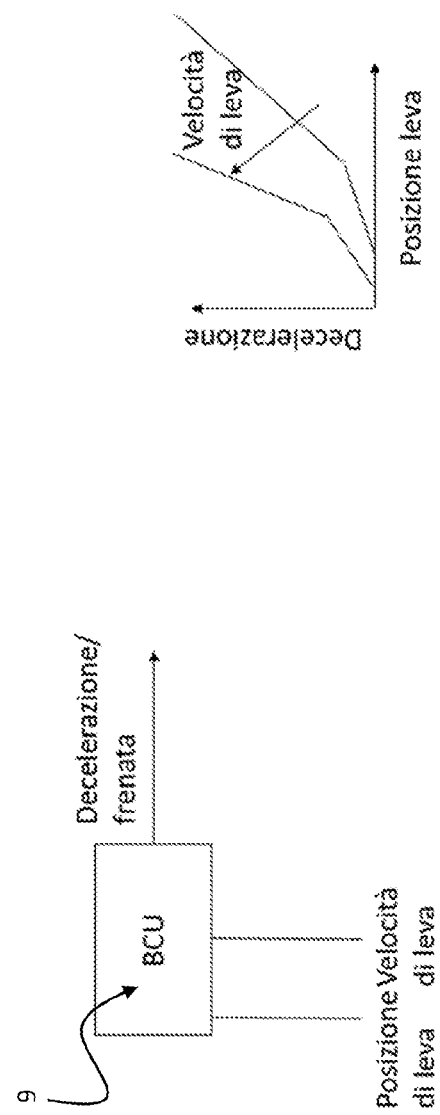
Figure 6:
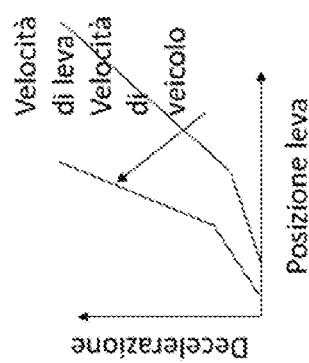
Figure 5:
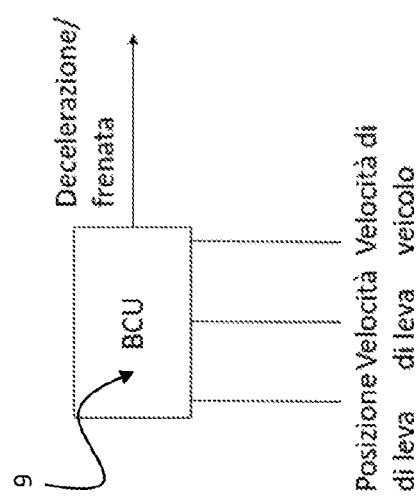
Figure 8:
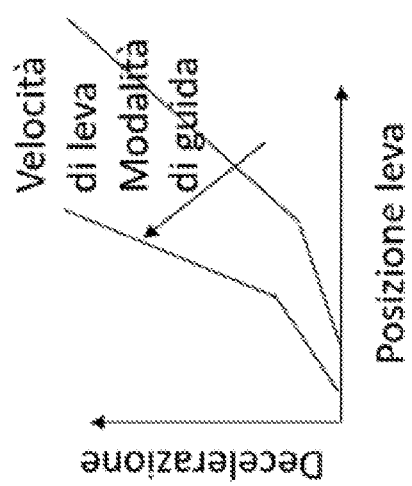
Figure 7:
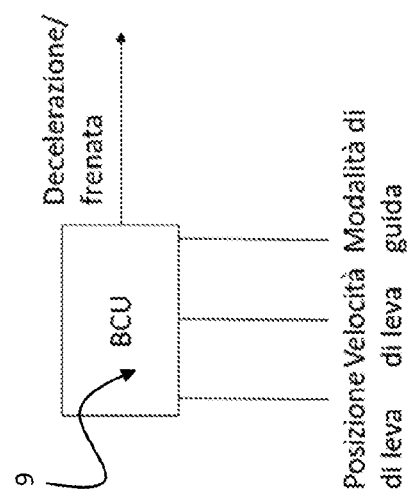
Figure 10:
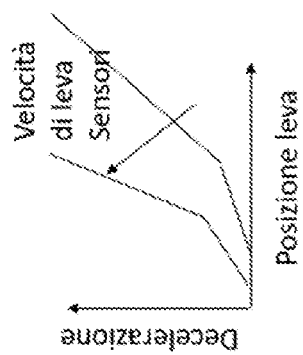
Figure 9:
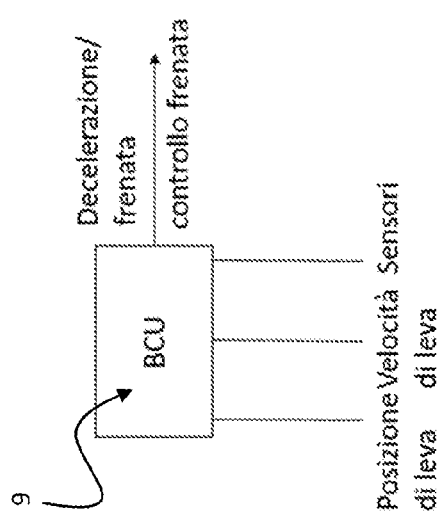
Figure 12:
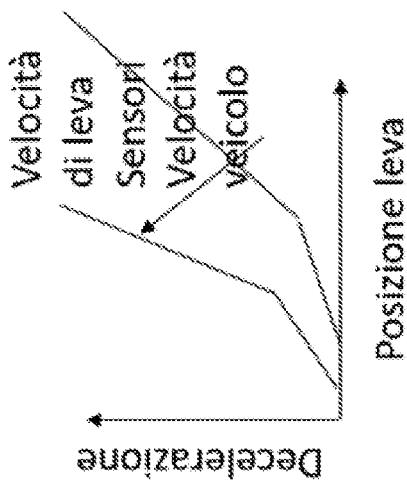
Figure 11:
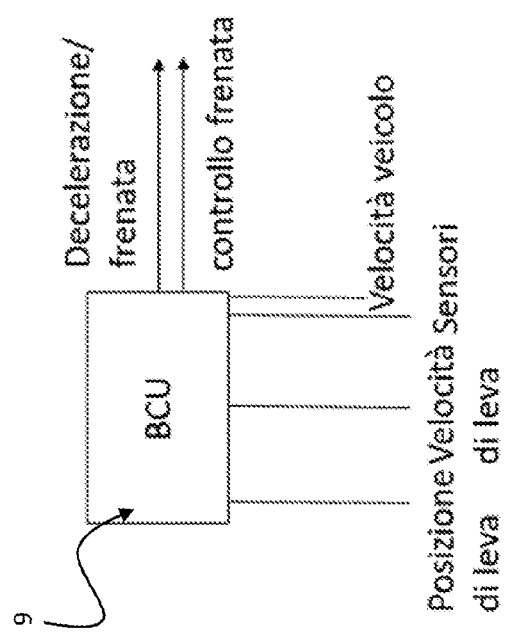

FIG. 3 is a general flow diagram of a plurality of signals processed by a control unit to provide a deceleration curve according to the method for controlling deceleration of the present invention, FIG. 4 is a general deceleration curve generated by the control unit in FIG. 3, FIG. 5 is a first flow diagram of a plurality of signals processed by a control unit to provide a deceleration curve according to an operating mode of the method FIG. 6 is a deceleration curve generated by the control unit in FIG. 5, FIG. 7 is a second flow diagram of a plurality of signals processed by a control unit to provide a deceleration curve according to a further operating mode of the method, FIG. 8 is a deceleration curve generated by the control unit in FIG. 7, FIG. 9 is a third flow diagram of a plurality of signals processed by a control unit to provide a deceleration curve according to a further operating mode of the method, FIG. 10 is a deceleration curve generated by the control unit in FIG. 9, FIG. 11 is a fourth flow diagram of a plurality of signals processed by a control unit to provide a deceleration curve according to a further operating mode of the method, FIG. 12 is a deceleration curve generated by the control unit in FIG. 11

Figure 13:
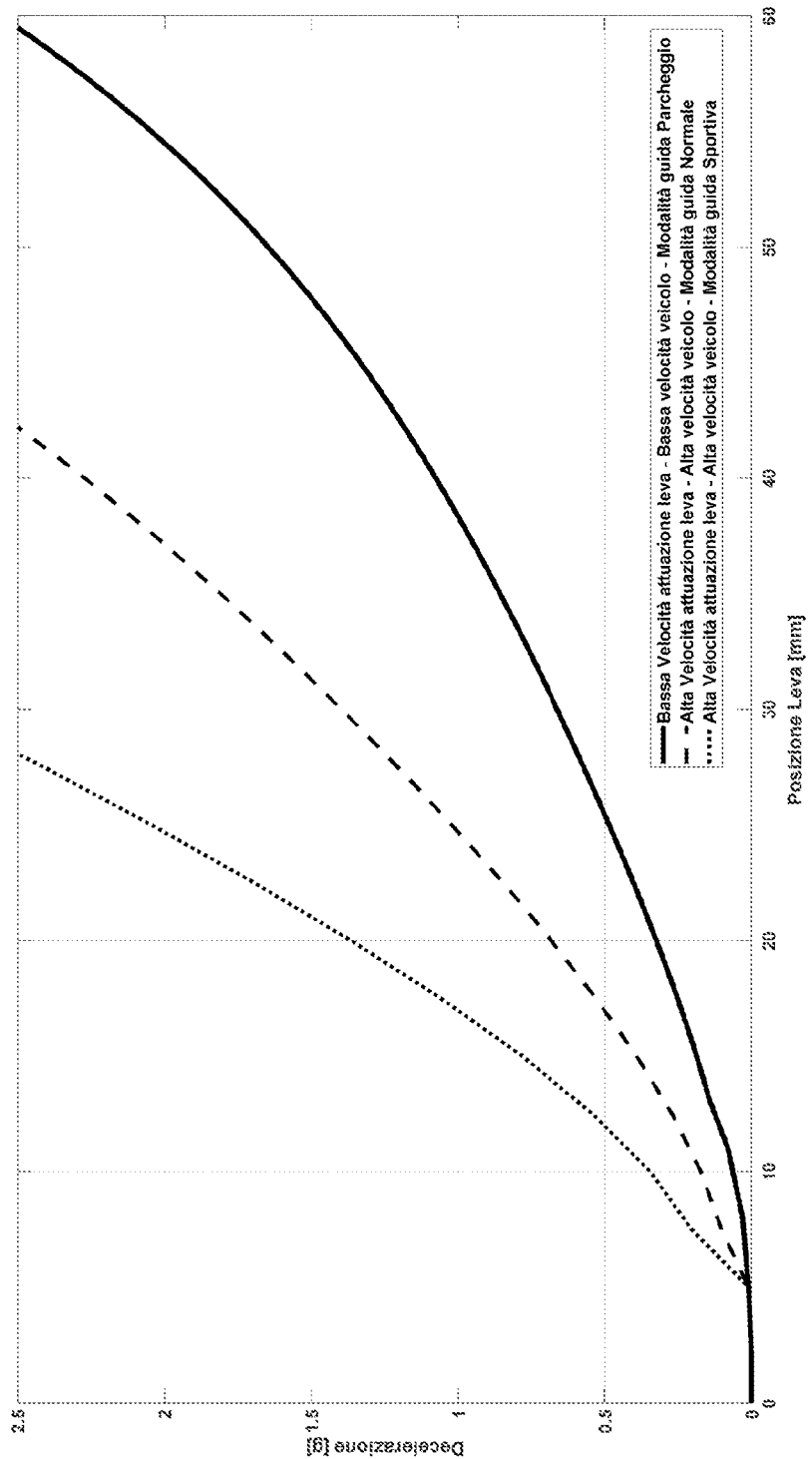

FIG. 13 shows three different deceleration curves as a function of the lever position, different vehicle speeds, different lever actuation speeds and different driving modes.

DESCRIPTION OF SOME PREFERRED EMBODIMENTS

According to a general operating mode, a method is described for controlling the deceleration of a vehicle 1, wherein said vehicle 1 comprises a braking system 2, wherein said braking system 2 comprises at least one braking actuation lever 3, a braking actuator 8 and at least one braking device 6.

Said method comprises step a—measuring the current lever position s(t) of said lever 3 and the current lever speed ds(t)/dt of said lever 3.

Said method comprises step b-dynamically mapping said current lever position s(t) and said current lever actuation speed ds(t)/dt.

Said method comprises step c—processing a deceleration curve as a function of the dynamic mapping in step b.

Said method comprises step d-decelerating said vehicle 1 according to said deceleration curve for each current lever position s(t) measured in a lever stroke.

According to an operating mode, said step b—is carried out at the same time as said step a—.

According to an operating mode, said step b—comprises defining a law and/or curve and/or equation, which establishes a relation between a deceleration requested for said vehicle and the lever position, or current lever position s(t), and establishes a correction function of said relation, wherein said correction function depends on the lever actuation speed ds(t)/dt.

According to an operating mode, said step b—comprises defining said relation with a polynomial function of the current lever position s(t).

According to an operating mode, said step b—comprises defining said correction function as a correction factor multiplied by the lever actuation speed ds(t)/dt.

According to an operating mode, said step b—comprises defining said relation and said correction function continuously, for each instant of time.

According to an operating mode, said step b—comprises defining said relation and said correction function for specific intervals of time.

According to an operating mode, said method comprises a step e—prior to step a—, selecting a driving mode selected from a plurality of driving modes.

According to an operating mode, step c—comprises sub-step f—modifying said deceleration curve as a function of the driving mode selected in step e—.

According to an operating mode, said plurality of driving modes comprises at least one parking mode and/or a traffic driving mode and/or a sporty driving mode and/or a normal driving mode and/or a snow driving mode and/or an ice driving mode and/or a city driving mode and/or a mud driving mode and/or a sand driving mode and/or a customizable driving mode.

According to an operating mode, said step e—occurs by means of a driving mode selector 15 of said vehicle 1 operatively connected to said braking system 2.

According to an operating mode, said step e—occurs by means of the selection of a vehicle 1 user.

According to an operating mode, said step e—occurs by means of the automatic processing of a control unit 9.

According to an operating mode, said method comprises a step g—carried out at least overlapping said step a—measuring at least one vehicle variable selected from a plurality of vehicle variables.

According to an operating mode, said method comprises a step h—carried out at least parallel to said step b—, processing an estimate of the vehicle dynamics as a function of said at least one vehicle variable measured in step g—.

According to an operating mode, in said step h—, said estimate of the vehicle dynamics comprises estimating the grip of the vehicle, and/or the tire inflation and/or the generation of friction of the braking system.

According to an operating mode, said method comprises a step i—modifying said deceleration curve as a function of the estimate of the vehicle dynamics in step h—.

According to an operating mode, said plurality of vehicle variables comprises at least one variable related to the grip of the vehicle, e.g. calculated by evaluating the relation between the ground forces and the weight force at defined slip gradient thresholds and/or one variable related to a tire inflation pressure associated with a wheel 7 of said vehicle 1 and/or one variable related to the temperature of said braking system 2.

According to an operating mode, said method comprises a step l—parallel to step c—, selecting a braking actuation mode available from a plurality of braking actuation modes as a function of the dynamic mapping in step b—.

According to an operating mode, said method comprises a step m—carried out at the same time as step d—, actuating said at least one braking device 6 according to said selected braking actuation mode According to an operating mode, step l—comprises sub-step n—modifying said braking actuation mode selected as a function of the estimate of the vehicle dynamics in step h—.

According to an operating mode, said plurality of braking actuation modes comprises at least one quick braking actuation mode and/or one slow braking actuation mode and/or one normal braking mode and/or one noisy braking mode and/or one programmable braking mode.

According to an operating mode, said method comprises a step o—detecting the vehicle speed Vv.

According to an operating mode, step c—comprises sub-step p—modifying said deceleration curve as a function of the vehicle speed detected in step o—.

According to an operating mode, said method comprises a step q—parallel to step c—, selecting a braking actuation control mode from a plurality of braking actuation control modes as a function of the dynamic mapping in step b—.

According to an operating mode, said method comprises a step r—carried out at the same time as step d—, controlling said at least one braking device 6 according to said braking actuation mode selected in step q.

According to an operating mode, step q—comprises sub-step s—modifying said braking actuation control mode selected as a function of the estimate of the vehicle dynamics in step h—.

According to an operating mode, step q—comprises sub-step t—modifying said braking actuation control mode selected as a function of the vehicle speed detected in step o—.

According to an operating mode, said lever 3 is movable by a maximum stroke comprised between a resting position and a stroke-end position.

According to an operating mode, said plurality of braking actuation control modes comprises at least one performance braking actuation control mode and/or one comfort braking control mode and/or one abs braking control mode and/or one noisy braking control mode and/or one pulling over braking control mode.

According to an operating mode, said deceleration curve is an increasing function with respect to said current lever position s(t).

According to an operating mode, said deceleration curve is increasing monotonic.

According to an operating mode, said deceleration curve has an inflection.

According to an operating mode, said deceleration curve comprises a maximum at the lever end-of-stroke position.

Three different deceleration curves can be observed in FIG. 13 as a function of the lever position, according to three different driving modes, parking, normal, sporty, and according to different lever actuation speeds and different vehicle speeds.

The present invention also relates to a braking system generally denoted with reference numeral 2.

Said braking system 2 comprises a braking actuation lever 3, a lever position sensor 4 configured to detect at least one current lever position s(t) of said braking actuation lever 3, a lever speed sensor 5 configured to detect at least one current lever speed ds(t)/dt of said braking actuation lever 3.

Said braking system 2 comprises at least one braking device 6 associated with a respective wheel 7 of said vehicle 1.

Said braking system 2 comprises a braking actuator 8 operatively connected to each braking device 6 and configured to actuate said braking device 6.

Said braking system 2 comprises at least one control unit 9 operatively connected to said lever position sensor 4, said lever speed sensor 5, and said braking actuator 8.

Said at least one control unit 9 is configured to dynamically map said current lever position s(t) and said current lever speed ds(t)/dt in a lever stroke.

Advantageously, said at least one control unit 9 is configured to process a deceleration curve as a function of said dynamic mapping with which said vehicle 1 is to be decelerated.

According to an embodiment, said braking system 2 comprises a braking actuation mode selector 25 operatively connected to said at least one control unit 9, said braking actuation mode selector 25 being configured to select a braking actuation mode from a plurality of braking actuation modes available from said control unit. According to an embodiment, said at least one control unit 9 is configured to select a braking actuation mode from a plurality of braking actuation modes.

According to an embodiment, said at least one control unit 9 is configured to select said braking actuation mode on the basis of a plurality of inputs.

According to an embodiment, said at least one control unit 9 is configured to control said braking actuator 8 according to said selected braking actuation mode.

According to an embodiment, said at least one control unit 9 is configured to select a braking actuation mode from a plurality of braking actuation control modes.

According to an embodiment, said braking system 2 comprises a braking actuation control mode selector 24 operatively connected to said at least one control unit 9, said braking actuation control mode selector 24 being configured to select a braking actuation mode from a plurality of braking actuation modes.

According to an embodiment, said at least one control unit 9 is configured to control said braking actuator 8 according to said selected braking actuation control mode.

According to an embodiment, said braking system 2 comprises a driving mode selector 15 configured to select a driving mode from a plurality of driving modes, wherein said driving mode selector 15 is operatively associated with said at least one control unit 9, and wherein said at least one control unit 9 is configured to modify said deceleration curve as a function of said selected driving mode.

According to an embodiment, said braking system 2 comprises at least one vehicle dynamics variable measurement sensor 10 comprised from:
  a wheel speed sensor 11 for each wheel 7 of said vehicle 1, wherein said wheel speed sensor 11 is configured to detect the rotation speed of the corresponding wheel 7, wherein said speed sensor 11 is operatively associated with said at least one control unit 9,
  at least one tire pressure sensor 12 configured to measure an inflation pressure of a tire associated with each wheel 7, wherein said at least one tire pressure sensor 12 is operatively associated with said at least one control unit 9,
  at least one accelerometer 13 configured to measure at least one vehicle acceleration to which said vehicle 1 is subjected, wherein said at least one accelerometer 13 is operatively associated with said at least one control unit 9,
  at least one gyroscope 14 configured to measure at least one angular vehicle speed to which said vehicle 1 is subjected, wherein said at least one gyroscope 14 is operatively associated with said at least one control unit 9,
  at least one vehicle speed sensor 16 configured to measure a current vehicle speed, wherein said vehicle speed sensor 16 is operatively associated with said at least one control unit 9,
  at least one proximity sensor 17 configured to measure the distance between the vehicle and an obstacle, wherein said at least one proximity sensor 17 is operatively associated with said at least one control unit 9,
  at least one humidity detection sensor 18 operatively connected to said at least one control unit 9,
  at least one rainfall sensor 19 configured to detect the presence and measure the amount of incident rain on the vehicle 1, wherein said at least one rainfall sensor 19 is operatively associated with said at least one control unit 9.

According to an embodiment, said at least one control unit 9 is configured to process an estimate of the vehicle dynamics as a function of said at least one vehicle variable.

According to an embodiment, said at least one control unit 9 is configured to process said driving mode as a function of said at least one vehicle variable.

According to an embodiment, said braking system 2 comprises at least one lever sensor associated with said lever 3, comprised from:
  a lever switch sensor 20 configured to detect a contact of a user with said lever 3,
  a lever stroke sensor 21 configured to measure a stroke of said lever 3,
  a lever pressure sensor 22 configured to measure a contact pressure with which a user contacts said lever 3, and
  a lever force sensor 23 configured to measure a force with which a user actuates said lever 3.

According to an embodiment, said at least one lever sensor is associated with said lever 3 and is operatively connected to said control unit 9.

According to an embodiment, said control unit 9 is configured to send to said at least one braking actuator 8 a signal representing said deceleration curve and/or said braking actuation control mode and/or said braking actuation mode, wherein said signal is a voltage and current signal.

According to an embodiment, said braking actuator 8 comprises a respective control and calibration unit 20 configured to process said signal sent from said control unit 9 and to control said braking device 6 with a processed signal.

LIST OF REFERENCES 1 vehicle
2 braking system
3 braking actuation lever
4 lever position sensor
5 lever speed sensor
6 braking device
7 wheel
8 braking actuator
9 control unit
10 vehicle dynamics variable measurement sensor
11 wheel speed sensor
12 tire pressure sensor 13 accelerometer
14 gyroscope
15 selector
16 vehicle speed sensor
17 proximity sensor
18 humidity detection sensor
19 rainfall sensor
20 lever switch sensor
21 lever stroke sensor
22 lever pressure sensor
23 lever force sensor
24 braking actuation control mode selector
25 braking actuation mode selector

The invention claimed is:

1. A method for controlling deceleration of a vehicle, wherein said vehicle comprises a braking system, wherein said braking system comprises at least one braking actuation lever, a braking actuator, and at least one braking device, said method comprising the following steps:
   a) measuring a current lever position of said braking actuation lever and a current lever speed of said braking actuation lever,
   b) dynamically mapping said current lever position and said current lever speed,
   c) processing a deceleration curve as a function of the dynamic mapping, and
   d) decelerating said vehicle according to said deceleration curve for each current lever position measured in a lever stroke,
   wherein said step b is carried out simultaneously with step a.

2. The method of claim 1, wherein said method further comprises
   e) before step a), selecting a driving mode selected from a plurality of driving modes,
   and wherein step c) comprises the sub-step of
   f) modifying said deceleration curve as a function of the driving mode selected in step e).

3. The method of claim 2, wherein said plurality of driving modes comprises at least one of a parking mode, a traffic driving mode, a sporty driving mode, a normal driving mode, a snow driving mode, an ice driving mode, a city driving mode, a mud driving mode, a sand driving mode, and a customizable driving mode, and/or wherein
   step e) occurs by means of a driving mode selector of said vehicle operatively connected to said braking system.

4. The method of claim 1, wherein said method further comprises
   the step, at least overlapping step a), of
   g) measuring at least one vehicle variable selected from a plurality of vehicle variables,
   and the step, at least overlapping step b), of
   h) processing an estimate of vehicle dynamics as a function of said at least one measured vehicle variable,
   and wherein step c) comprises the sub-step of
   i) modifying said deceleration curve as a function of the estimate of the vehicle dynamics.

5. The method of claim 4 wherein said plurality of vehicle variables comprises at least one of a variable related to grip of the vehicle, a variable related to a tire inflation pressure associated with a wheel of the vehicle, and a variable related to temperature of the braking system.

6. The method of claim 1, wherein said braking actuation lever is movable by a maximum stroke between a rest position and a stroke-end position, and/or wherein said deceleration curve is an increasing monotonic function with respect to said current lever position, and/or wherein said deceleration curve comprises a maximum at the stroke-end position.

7. The method of claim 1, further comprising
   l) selecting, in parallel to step c), a braking actuation mode available from a plurality of braking actuation modes as a function of the dynamic mapping, and
   m) actuating, simultaneously with step d), said at least one braking device according to said selected braking actuation mode.

8. The method of claim 7, wherein said method comprises
   the step, at least overlapping step a), of
   g) measuring at least one vehicle variable selected from a plurality of vehicle variables,
   and the step, at least overlapping step b), of
   h) processing an estimate of vehicle dynamics as a function of said at least one measured vehicle variable,
   wherein step c) comprises the sub-step of
   i) modifying said deceleration curve as a function of the estimate of the vehicle dynamics, and wherein step I) comprises the sub-step of
   n) modifying the selected braking actuation mode as a function of the estimate of the vehicle dynamics.

9. The method of claim 7, wherein said plurality of braking actuation modes comprises at least one of a quick braking actuation mode, a slow braking actuation mode, a normal braking mode, a noisy braking mode, and a programmable braking mode.

10. The method of claim 1, further comprising
    o) detecting a vehicle speed, wherein step c) comprises the sub-step of
    p) modifying said deceleration curve as a function of the vehicle speed detected in step o).

11. The method of claim 1, further comprising
    q) selecting, in parallel to step c), a braking actuation control mode from a plurality of braking actuation control modes as a function of the dynamic mapping, and
    r) controlling, simultaneously with step d), said at least one braking device according to said selected braking actuation control mode.

12. The method of claim 11, wherein said method comprises
    the step, at least overlapping step a), of
    g) measuring at least one vehicle variable selected from a plurality of vehicle variables,
    and the step, at least overlapping step b), of
    h) processing an estimate of vehicle dynamics as a function of said at least one measured vehicle variable,
    wherein step c) comprises the sub-step of
    i) modifying said deceleration curve as a function of the estimate of the vehicle dynamics, and
    wherein step q) comprises the sub-step of
    s) modifying said selected braking actuation control mode as a function of the estimate of the vehicle dynamics.

13. The method of claim 11, wherein said method comprises
    o) detecting a vehicle speed,
    wherein step c) comprises the sub-step of
    p) modifying said deceleration curve as a function of the vehicle speed detected in step o), and
    wherein step q) comprises the sub-step of
    t) modifying said selected braking actuation control mode as a function of the vehicle speed detected in step o).

14. The method of claim 11, wherein said plurality of braking actuation control modes comprises at least one of a performance braking actuation control mode, a comfort braking control mode, an ABS braking control mode, a noisy braking control mode, and a pulling over braking control mode.

15. A braking system of a vehicle, comprising:
a braking actuation lever,
a lever position sensor configured to detect at least one current lever position of said braking actuation lever,
a lever speed sensor configured to detect at least one current lever speed of said braking actuation lever,
at least one braking device associated with a respective wheel of said vehicle, a braking actuator operatively connected to the at least one braking device and configured to actuate said at least one braking device,
at least one control unit operatively connected to said lever position sensor, said lever speed sensor, and said braking actuator,
wherein said at least one control unit is configured to dynamically map said current lever position and said current lever speed in a lever stroke at the same time that the current lever position and the current lever speed are measured, and
wherein said at least one control unit is configured to process a deceleration curve as a function of dynamic mapping with which said vehicle is to be decelerated.

16. The braking system of claim 15, wherein said at least one control unit is configured to select a braking actuation mode from a plurality of braking actuation modes, wherein said at least one control unit is configured to control said braking actuator according to the selected braking actuation mode, and/or wherein
said at least one control unit is configured to select a braking actuation control mode from a plurality of braking actuation control modes, wherein said at least one control unit is configured to control said braking actuator according to said selected braking actuation control mode, and/or wherein
said braking system comprises a driving mode selector configured to select a driving mode from a plurality of driving modes, wherein said driving mode selector is operatively associated with said at least one control unit, and wherein said at least one control unit is configured to modify said deceleration curve as a function of the selected driving mode.

17. The braking system of claim 15, further comprising at least one vehicle dynamics variable measurement sensor selected from:
a wheel speed sensor for each wheel of said vehicle, wherein said wheel speed sensor is configured to detect a rotation speed of a corresponding wheel, wherein said wheel speed sensor is operatively associated with said at least one control unit,
at least one tire pressure sensor configured to measure an inflation pressure of a tire associated with said wheel, wherein said at least one tire pressure sensor is operatively associated with said at least one control unit,
at least one accelerometer configured to measure at least one vehicle acceleration to which said vehicle is subjected, wherein said at least one accelerometer is operatively associated with said at least one control unit, at least one gyroscope configured to measure at least one angular vehicle speed to which said vehicle is subjected, wherein said at least one gyroscope is operatively associated with said at least one control unit,
at least one vehicle speed sensor configured to measure a current vehicle speed, wherein said at least one vehicle speed sensor is operatively associated with said at least one control unit,
at least one proximity sensor configured to measure a distance between the vehicle and an obstacle, wherein said at least one proximity sensor is operatively associated with said at least one control unit,
at least one humidity detection sensor operatively connected to said at least one control unit, and
at least one rainfall sensor configured to detect presence and measure an amount of incident rain on the vehicle, wherein said at least one rainfall sensor is operatively associated with said at least one control unit.

18. The braking system of claim 16, wherein said at least one control unit is configured to process an estimate of vehicle dynamics as a function of at least one vehicle variable, and/or wherein said at least one control unit is configured to process said driving mode as a function of said at least one vehicle variable.

19. The braking system of claim 15, further comprising at least one lever sensor associated with said braking actuation lever and operatively connected to said at least one control unit, wherein said at least one lever sensor is selected from:
a lever switch sensor configured to detect a contact of a user with said braking actuation lever,
a lever stroke sensor configured to measure a stroke of said braking actuation lever,
a lever pressure sensor configured to measure a contact pressure with which the user contacts said braking actuation lever, and
a lever force sensor configured to measure a force with which the user actuates said braking actuation lever.

20. The braking system of claim 16, wherein said at least one control unit is configured to send to said at least one braking actuator a signal representing at least one of said deceleration curve, said braking actuation control mode, and said braking actuation mode, wherein said signal is a voltage and current signal, and/or wherein said braking actuator comprises a respective calibration and control unit configured to process said signal sent by said at least one control unit and control said braking device with a processed signal.

* * * * *